US012649626B1

(12) United States Patent
Walet

(10) Patent No.: US 12,649,626 B1
(45) Date of Patent: Jun. 9, 2026

(54) RE-ROUTING STORAGE ITEMS IN A WAREHOUSE

(71) Applicant: Lineage Logistics, LLC, Irvine, CA (US)

(72) Inventor: Daniël Walet, Oakland, CA (US)

(73) Assignee: Lineage Logistics, LLC, Irvine, CA (US)

( * ) Notice: Subject to any disclaimer, the term of this patent is extended or adjusted under 35 U.S.C. 154(b) by 819 days.

(21) Appl. No.: 18/096,888

(22) Filed: Jan. 13, 2023

Related U.S. Application Data

(60) Provisional application No. 63/299,153, filed on Jan. 13, 2022.

(51) Int. Cl.
| | |
|---|---|
| B65G 1/04 | (2006.01) |
| B65G 1/06 | (2006.01) |
| G06Q 10/08 | (2024.01) |

(52) U.S. Cl.
CPC ............. B65G 1/0485 (2013.01); B65G 1/06 (2013.01); G06Q 10/08 (2013.01)

(58) Field of Classification Search
CPC .... G06Q 10/08; G06Q 10/087; G06Q 10/047; B65G 1/0485; B65G 1/06
USPC ....................................................... 700/214
See application file for complete search history.

(56) References Cited

U.S. PATENT DOCUMENTS

| | | | |
|---|---|---|---|
| 3,093,252 | A | 6/1963 | Cahill |
| 3,434,604 | A | 3/1969 | Haldimann et al. |

| | | | |
|---|---|---|---|
| 3,613,910 | A | 10/1971 | Weir |
| 3,677,421 | A | 7/1972 | Kintner |
| 4,093,086 | A | 6/1978 | Lucas et al. |
| 5,953,234 | A | 9/1999 | Singer et al. |
| 6,450,751 | B1 | 9/2002 | Hollander |
| 7,591,630 | B2 | 9/2009 | Lert, Jr. |
| 8,594,835 | B2 | 11/2013 | Lert et al. |

(Continued)

FOREIGN PATENT DOCUMENTS

| | | |
|---|---|---|
| EP | 1521194 | 4/2005 |

OTHER PUBLICATIONS

Brandão et al., "Bin Packing and Related Problems: General Arc-flow Formulation with Graph Compression," Technical Report Series: DCC-2013-08, Sep. 26, 2013, 29 pages.

(Continued)

*Primary Examiner* — Timothy R Waggoner
(74) *Attorney, Agent, or Firm* — Barnes & Thornburg LLP

(57) ABSTRACT

This specification generally discloses a computer-implemented method for re-routing items in a warehouse, comprising designating a first storage location in the warehouse as a destination storage location for an item; sending first instructions to a mechanical conveying system to automatically move the item from a first current position to the first storage location using the mechanical conveying system; determining, while the item is being moved to the first storage location by the mechanical conveying system, that a state of items being moved by the mechanical conveying system satisfies a criterion to change the destination storage location for the item from the first storage location to a second storage location; and sending second instructions to the mechanical conveying system to automatically move the item from a second current position of the item to the second storage location using the mechanical conveying system.

20 Claims, 7 Drawing Sheets

(56) References Cited

U.S. PATENT DOCUMENTS

| | | | |
|---|---|---|---|
| 8,918,750 B1 | 12/2014 | Moffitt | |
| 9,262,681 B1 | 2/2016 | Mishra | |
| 9,336,509 B1 | 5/2016 | Arun Singhal et al. | |
| 9,776,794 B2 | 10/2017 | Sullivan et al. | |
| 10,133,990 B2 * | 11/2018 | Hance | G06Q 10/06311 |
| 10,259,648 B2 * | 4/2019 | Wolf | G06Q 10/08 |
| 10,815,058 B2 | 10/2020 | Wolf et al. | |
| 11,182,743 B2 | 11/2021 | Li et al. | |
| 12,172,846 B2 * | 12/2024 | Wintz | G06Q 10/087 |
| 2002/0178074 A1 | 11/2002 | Bloom | |
| 2004/0215480 A1 | 10/2004 | Kadaba | |
| 2006/0020366 A1 | 1/2006 | Bloom | |
| 2007/0134077 A1 | 6/2007 | Laurin et al. | |
| 2007/0156536 A1 | 7/2007 | Alfandary et al. | |
| 2011/0106295 A1 | 5/2011 | Miranda et al. | |
| 2012/0061338 A1 | 3/2012 | Willick et al. | |
| 2015/0178816 A1 | 6/2015 | Zak | |
| 2017/0091704 A1 | 3/2017 | Wolf et al. | |
| 2017/0301004 A1 | 10/2017 | Chirnomas | |
| 2018/0154399 A1 | 6/2018 | Wagner et al. | |
| 2018/0225597 A1 | 8/2018 | Hance | |
| 2018/0290831 A1 | 10/2018 | Wolf et al. | |
| 2021/0323767 A1 | 10/2021 | Liu et al. | |

OTHER PUBLICATIONS

Gu et al., "Research on warehouse design and performance evaluation: A comprehensive review," European Journal of Operational Research, Jun. 2010, 203(3):539-549.

International Search Report and Written Opinion in International Application No. PCT/US2016/054551, dated Dec. 5, 2016, 12 pages.

International Search Report and Written Opinion in International Application No. PCT/US2018/026427, dated Jul. 6, 2018, 12 pages.

Lee et al., "Optimal design of rack structure with modular cell in AS/RS," Int. J. Production Economics, Nov. 2005, 98(2):172-178.

Roodbergen et al., "A survey of literature on automated storage and retrieval systems," European Journal of Operational Research, Apr. 2009, 194(2):343-362.

* cited by examiner

400

402

Designate a First Storage Location of an Item as a Destination Storage Location

404

Designate a Second Storage Location as a Reserved Storage Location

406

Send First Instructions to Move Item to the First Storage location

408

Move Item to the Storage Location

410

400

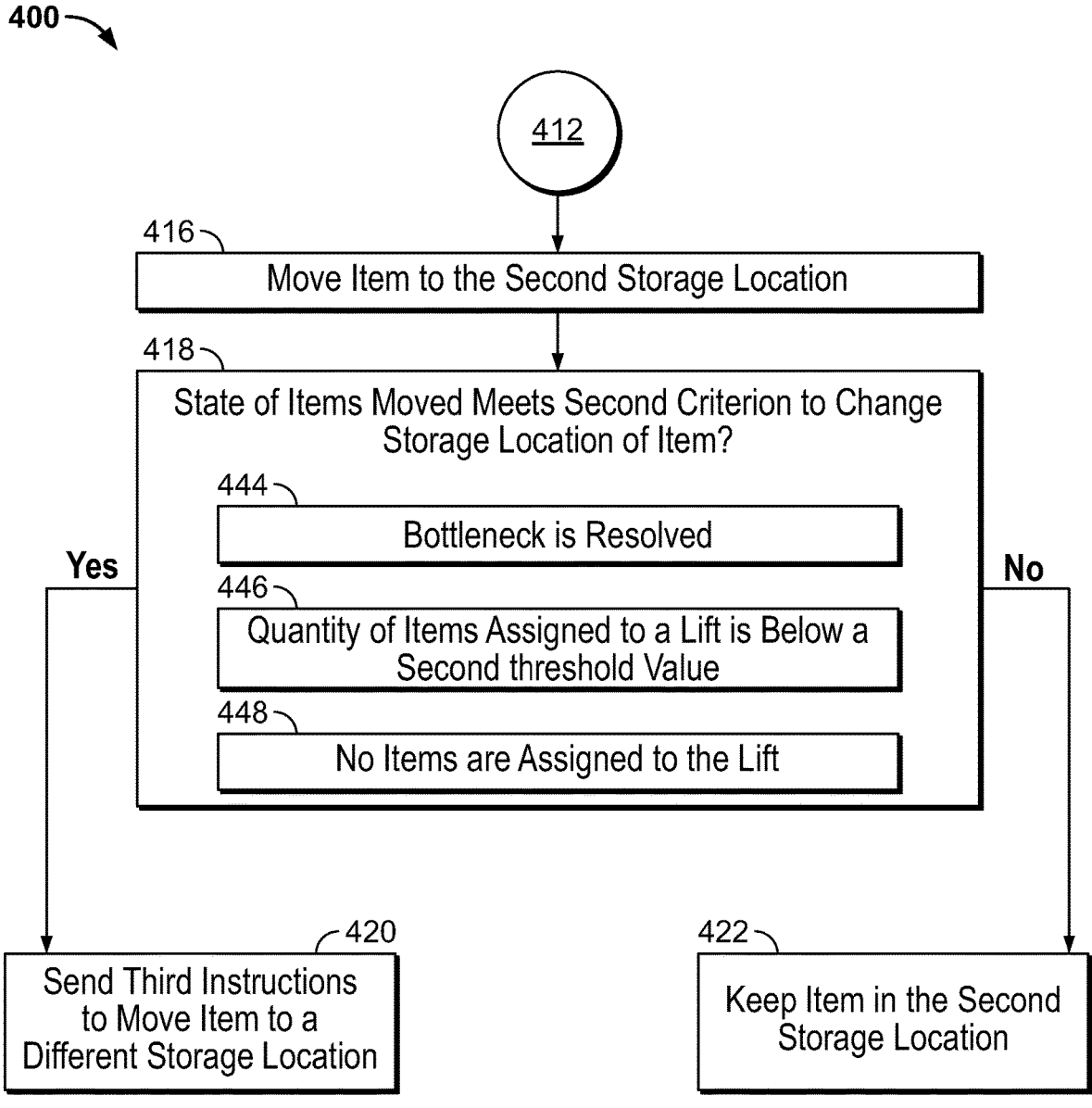

412

416
Move Item to the Second Storage Location

418
State of Items Moved Meets Second Criterion to Change Storage Location of Item?

444
Bottleneck is Resolved

446
Quantity of Items Assigned to a Lift is Below a Second threshold Value

448
No Items are Assigned to the Lift

Yes

No

420
Send Third Instructions to Move Item to a Different Storage Location

422
Keep Item in the Second Storage Location

FIG. 4C

RE-ROUTING STORAGE ITEMS IN A WAREHOUSE

CROSS-REFERENCE TO RELATED APPLICATIONS

This application claims priority to U.S. Provisional Patent Application No. 63/299,153, filed on Jan. 13, 2022, which is hereby incorporated by reference in its entirety.

TECHNICAL FIELD

This document generally describes moving items around a warehouse for storage.

BACKGROUND

A warehouse can receive thousands of pallets a day, all of which have to be stored in different locations throughout the warehouse. Sometimes, large volumes of pallets can congest the warehouse, making the process of routing the pallets to their storage locations throughout the warehouse more challenging. Traditionally, when this happens, pallets can be moved off of conveyor belts or deposited in an open space in a docking area of the warehouse until there is sufficient bandwidth in the warehouse to move those pallets to their storage destinations.

SUMMARY

This document generally describes systems and methods for routing items in a warehouse for temporary storage.

A warehouse can include one or more storage locations or areas, conveying systems (e.g., moving belts such as conveyor belts, rollers, trolleys), and lift mechanisms, such as elevators. Items, such as pallets, can be placed on a conveying lane to be routed to storage destinations throughout the warehouse. The conveying lane can be attached to one or more elevators that take items to designated or specified levels of storage in the warehouse. A temporary storage location, such as a reserve location, can be designated alongside the elevators. As a result, when items are in a queue on a conveying lane to enter an elevator for storage, one or more of the items can be re-routed to the reserve location for temporary storage. The items can remain in the reserve location until a bottleneck is cleared up, volume on the conveying lane is reduced, and/or other conditions are met. The items can then be re-routed back onto the conveying lane to continue along to their final storage destinations.

As additional description to the embodiments described below, the present disclosure describes the following embodiments.

Embodiment 1 is computer-implemented method for re-routing items in a warehouse, comprising: designating, by a computing system, a first storage location in the warehouse as a destination storage location for an item; sending, by the computing system as a result of the first storage location being designated as the destination storage location for the item, first instructions to a mechanical conveying system to automatically move the item from a first current position of the item in the warehouse to the first storage location using the mechanical conveying system; determining, by the computing system while the item is being moved to the first storage location by the mechanical conveying system, that a state of items being moved by the mechanical conveying system satisfies a criterion to change the destination storage location for the item from the first storage location to a second storage location; and sending, by the computing system, second instructions to the mechanical conveying system to automatically move the item from a second current position of the item in the warehouse to the second storage location using the mechanical conveying system.

Embodiment 2 is the method of embodiment 1, wherein the mechanical conveying system includes conveyor belts, conveyor rollers, or a trolley system that move items from a docking area of the warehouse to destination storage locations of the warehouse without user intervention.

Embodiment 3 is the method of any one of embodiments 1-2, wherein: the warehouse stores items on multiple levels; the first storage location is located above a first level of the multiple levels; and the second storage location is a reserved storage location that is on the first level of the multiple levels, wherein the second storage location is reserved for items that are re-routed during movement by the mechanical conveying system.

Embodiment 4 is the method of any one of embodiments 1-3, wherein the criterion to change the destination location for the item includes a quantity of items exceeding a threshold value, wherein the quantity of items are assigned to a mechanical-moving device that is part of the mechanical conveying system and the item is one of the items assigned to the mechanical-moving device.

Embodiment 5 is the method of embodiment 4, wherein the warehouse stores items on multiple levels, and the mechanical-moving device is a lift adapted to move items from a first level of the multiple levels to levels above the first level of the multiple levels.

Embodiment 6 is the method of embodiment 5, wherein: the quantity of items assigned to the mechanical-moving device comprises a quantity of items queued at the lift; and the criterion to change the destination location for the item includes the quantity of items queued at the lift exceeding a threshold value.

Embodiment 7 is the method of embodiment 6, wherein the criterion to change the destination storage location for the item includes the item being closest to the lift among the quantity of items queued at the lift.

Embodiment 8 is the method of any one of embodiments 6 or 7, wherein the criterion to change the destination location for the item includes the quantity of items queued at the lift extending or about to extend (i) from a portion of the mechanical conveying system that serves the lift and not a second lift (ii) into a portion of the mechanical conveying system that serves the lift and the second lift.

Embodiment 9 is the method of embodiment 4, further comprising: determining, by the computing system while the item is stored at the second storage location, that a state of items being moved by the mechanical conveying systems satisfies a second criterion to change the destination storage location for the item from the second storage location to a different storage location; and sending, by the computing system, third instructions to the mechanical conveying system to automatically move the item from the second storage location to the different storage location.

Embodiment 10 is the method of embodiment 9, wherein the different storage location is the first storage location.

Embodiment 11 is the method of any one of embodiments 9-10, wherein the second criterion comprises the quantity of items assigned to the mechanical-moving device being below a second threshold value, the second threshold value being less than the threshold value.

Embodiment 12 is the method of any one of embodiments 9-10, wherein the second criterion comprises no items being assigned to the mechanical-moving device.

Embodiment 13 is the method of any one of embodiments 1-12, wherein the item is a pallet with boxes thereon.

Embodiment 14 is the method of embodiment 6, further comprising: identifying that a second item has been added to an end of the quantity of items queued at the lift; and wherein determining, by the computing system while the item is being moved to the first storage location by the mechanical conveying system, that a state of items being moved by the mechanical conveying system satisfies the criterion to change the destination storage location for the item from the first storage location to a second storage location is performed in response to identifying that the second item has been added to the end of the quantity of items queued at the lift.

Embodiment 15 is the method of any one of embodiments 1-14, further comprising reserving a plurality of storage locations that are on the first level of the multiple levels, wherein the plurality of storage locations are reserved for items that are re-routed during movement by the mechanical conveying system.

Embodiment 16 is a system for re-routing items in a storage facility, the system comprising: a warehouse having multiple levels to store items; a mechanical conveying system configured to automatically move an item at a first current position in the warehouse from the first current position in the warehouse to a first storage location, the mechanical conveying system including a mechanical-moving device that is part of the mechanical conveying system and is adapted to move items from a first level of the multiple levels to levels above the first level of the multiple levels; a second storage location that is a reserved storage location on the first level of the multiple levels of the warehouse; and a computing system configured to: designate the first storage location in the warehouse as a destination storage location for the item; send, as a result of the first storage location being designated as the destination storage location for the item, first instructions to the mechanical conveying system to automatically move the item from the first current position of the item to the first storage location; determine, while the item is being moved to the first storage location by the mechanical conveying system, that a state of items being moved by the mechanical conveying system satisfies a criterion to change the destination storage location for the item from the first storage location to the second storage location; and sending, by the computing system, second instructions to the mechanical conveying system to automatically move the item from a second current position of the item in the warehouse to the second storage location.

Embodiment 17 is the system of embodiment 16, wherein the mechanical conveying system includes conveyor belts, conveyor rollers, or a trolley system that move items from a docking area of the warehouse to destination storage locations of the warehouse without user intervention.

Embodiment 18 is the system of any one of embodiments 16-17, wherein: the first storage location is located above the first level of the multiple levels and the second storage location is reserved for items that are re-routed during movement by the mechanical conveying system; and the mechanical-moving device is a lift.

Embodiment 19 is the system of embodiment 18, wherein the criterion to change the destination location for the item includes a quantity of items exceeding a threshold value, wherein the quantity of items are assigned to the mechanical-moving device and the item is one of the items assigned to the mechanical-moving device.

Embodiment 20 is the system of embodiment 19, wherein: the quantity of items assigned to the mechanical-moving device comprises a quantity of items queued at the lift; and the criterion to change the destination location for the item includes the quantity of items queued at the lift exceeding a threshold value.

One or more advantages can be recognized from the disclosed systems and methods. For example, warehouse efficiency can be improved. Actual storage areas near elevators or conveying lanes can be designated as temporary storage locations. A pallet that is on a conveying lane or in line to enter the elevator can be quickly moved (e.g., re-routed) into the temporary storage location. Once the line or other bottleneck clears up, the pallet can be put back in its original position on the conveying lane to continue on its route to storage in the warehouse. Therefore, because temporary storage locations can be designated alongside areas of the warehouse that experience bottlenecks, pallets can be more quickly moved into temporary storage to clear up the bottlenecks. This is advantageous over traditional techniques in which pallets were re-routed to open spaces or other areas in the warehouse designated for storing excess pallets until a time when the excess pallets can be routed through the warehouse. Thus, overall warehouse efficiency increases.

As yet another example, warehouse efficiency can be improved because pallets can be re-routed to temporary storage locations based on a duration of time that they will be stored in the warehouse. Pallets that will be stored in the warehouse for an extended period of time can continue to be routed to their respective storage locations. Pallets that will be stored in the warehouse for a short amount of time can be re-routed into temporary storage locations. Those pallets can remain in temporary storage until they need to be moved out of the warehouse. As a result, routing pallets that are remaining in the warehouse for a longer period of time can become a more efficient process that avoids potential bottlenecks with pallets that are only being stored in the warehouse for a short amount of time.

As another example, re-routing pallets to temporary storage locations is advantageous to reduce bottlenecks. Pallets that cause the bottlenecks can be re-routed to temporary storage to resolve the bottlenecks. The pallets can then be automatically moved to the pallet's original destination location.

The details of one or more embodiments are set forth in the accompanying drawings and the description below. Other features and advantages will be apparent from the description and drawings, and from the claims.

BRIEF DESCRIPTION OF DRAWINGS

FIGS. 4A-C depict a flowchart of a process for re-routing items in the warehouse environment.

DETAILED DESCRIPTION

This document generally describes systems and methods for routing items in a warehouse for temporary storage. When items need to be routed through the warehouse, some items may be re-routed to temporary storage locations to improve efficiency in the warehouse. Rather than re-routed items being put to a side of conveying lanes or left in general open spaces, the items may be automatically moved into storage locations designated for a temporary storage. The disclosed technology provides for a more efficient solution in which specially identified locations in the warehouse can be designated as temporary storage locations. The temporary storage locations can be located within the storage area of the warehouse rather than in an open space, side room, or other area in a docking area of the warehouse. The temporary storage locations can also be near a conveying lane, lift system, or other mechanical system used in the warehouse. As a result, it can be easier and quicker to locate and move items into and out of the temporary storage locations.

An item can be routed to its designated destination storage location in the storage area of the warehouse. The item can be part of a queue of items that lead to a lift mechanism that moves the items to their designated storage locations. A computing system can determine whether the queue is too long or satisfies other conditions that result in having to move one or more items (e.g., the item) to the temporary storage locations. The one or more items closest to the lift mechanism can be automatically moved into a temporary storage location next to the lift mechanism. As a result, items that remain in the queue can be moved by the lift mechanism to their designated destination storage locations.

Once items that remain in the queue are moved to their designated destination storage locations, the one or more items that were re-routed to the temporary storage location can be routed back to the lift or the original locations in front of the lift mechanism. In other examples, the items can be routed to new destination locations. For example, the items can be routed to their original designated destination storage locations. As another example, where one or more of the items was moved to the temporary storage location because they are remaining in the warehouse for a short amount of time, the one or more items can be routed back to the docking area to be loaded onto one or more departing trucks.

Figure 1:
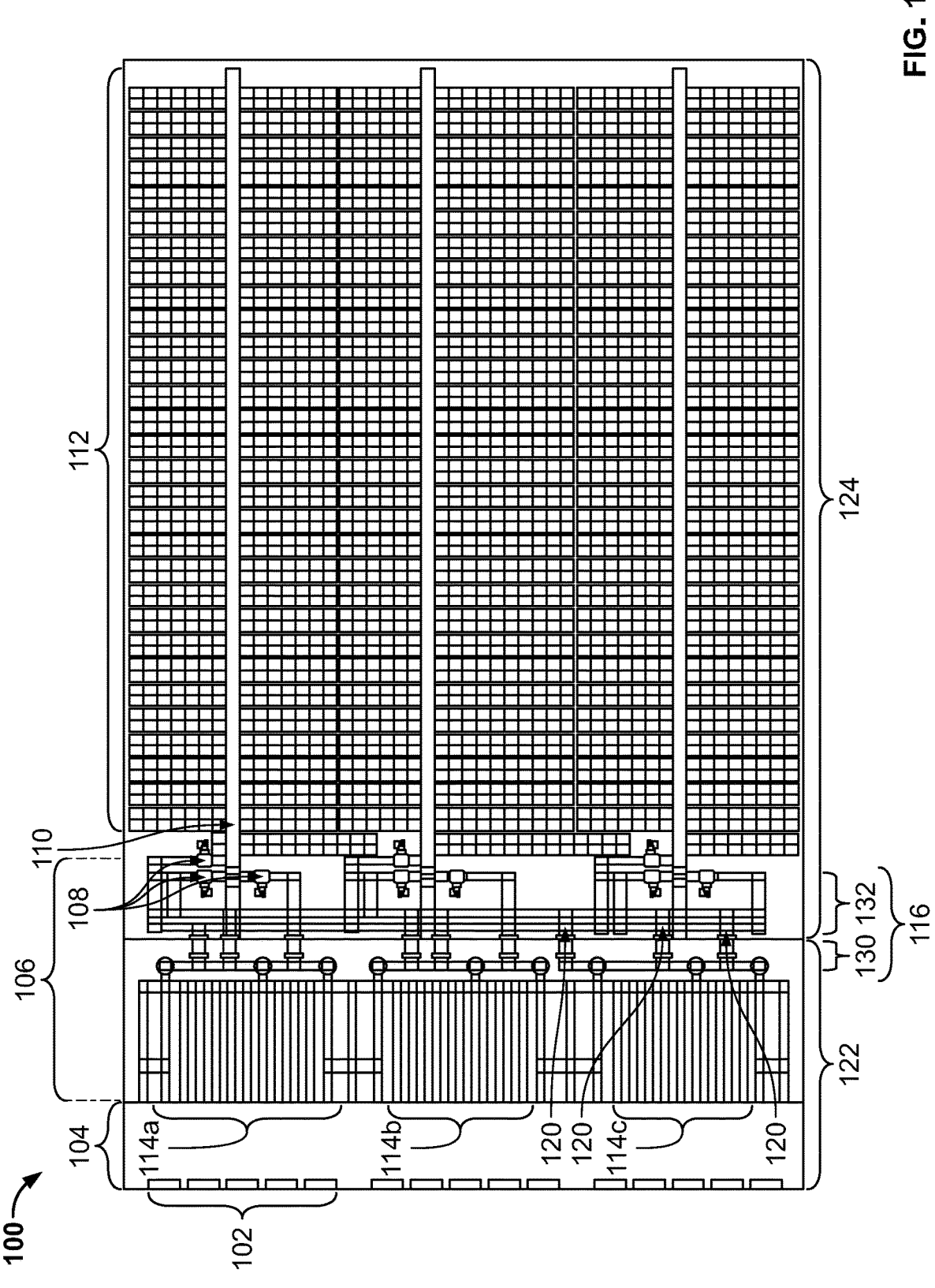
FIG. 1 depicts an example view of an automated warehouse environment.

FIG. 1 depicts an example view of an automated warehouse environment 100. One or more components of the warehouse 100 can be arranged in different configurations to generate an optimized automated warehouse design. The example components include truck doors/transport bays 102 that serve as an interface between trucks (e.g., cargo trailers) and the warehouse 100, and through which storage items from the trucks are loaded/unloaded. The warehouse components can further include forklifts that serve as the primary mechanism through which storage items (e.g., pallets of frozen food items) are loaded/unloaded from the trucks (other mechanisms for loading/unloading the storage items can also be used). The forklifts can be manually operated and/or automatic (machine) operated.

Forklifts can travel across a portion 104 of a docking area 122 of the warehouse 100, which is an open part of the warehouse 100 that permits maneuvering between the doors/ bays 102 and the automated components of the warehouse 100, which include conveyors 106 (including inbound-outbound conveyor modules 114 and routing conveyor modules 116), lifts 108 (e.g., elevators, cranes etc.), and carts 110 in the storage racks 112. The lifts 108 and carts 110 can be part of an automated shuttling subsystem that transfers items between storage locations in the racks 112 and the conveyors 106. In some examples, the lifts 108 can be elevators or other forms of lifts.

The conveyors 106 can carry storage items from the forklifts to the lifts 108, which lift the storage items to the appropriate row/level on the racks 112. The carts 110 can deliver the storage items from the lifts 108 to the assigned storage location for the storage items. Additional and/or alternative automation features are also possible. For example, rather than or in addition to lifts 108, the system may include elevators or other types lifts to raise or lower items within the warehouse 100.

Control algorithms, such as those running on a warehouse management computing system, can be used to direct and control the operation of the warehouse 100 and its components described herein to ensure that storage items are carried to the appropriate locations in an efficient manner.

The warehouse 100 can have one or more docking areas 122 and one or more storage areas 124. In the example shown in FIG. 1, the warehouse 100 has a single docking area 122 and a single storage area 124. The docking area 122 provides a space in the warehouse 100 to queue inbound storage items (e.g., storage items that have been unloaded from an incoming truck and that are to be stored in the storage racks 112 of the warehouse) and to queue outbound storage items (e.g., storage items that have been removed from the storage racks 112 and that have been assigned to be loaded onto an outgoing truck). The docking area 122 can include a row of truck doors/transport days at which delivery trucks can park and have storage items loaded onto or off of the trucks. In some warehouses, the docking area 122 also serves as an interface or buffer zone between the trucks and the storage area 124 of the warehouse.

For example, in a cold-storage warehouse, the storage area 124 may be maintained at very low temperatures in order to keep inventory (e.g., storage items) on the storage racks 112 frozen. Some storage items may require the storage area 124 to be kept as low as −10 degrees Fahrenheit, although lower or higher temperatures may also be possible depending on the precise requirements of the warehouse's customers and inventory. A physical barrier, such as one or more walls, may separate the docking area 122 from the storage area 124 in order to provide different climate conditions between the docking area 122 and the storage area 124. The physical barrier may also prevent cooling loss from a refrigerated storage area 124. For example, to ensure minimal cooling loss, only a limited number of relatively small passages 120 (e.g., semi-sealed passages) may be provided in a dividing wall between the docking area 122 and storage area 124 to allow inbound storage items and/or outbound storage items to be transferred between the two areas 122, 124 (e.g., on conveyors 106).

In some implementations, the docking area 122 includes a series of inbound-outbound conveyor modules 114a-n. FIG. 1 shows three such I/O conveyor modules 114a-c, by way of example. The number of I/O conveyor modules 114a-n in the docking area 122 may be selected as a function of the size of the docking area 122, storage area 124, or both, the number and arrangement of truck doors/transport bays 102, and the anticipated volume of inbound and outbound delivery processing. Each I/O conveyor module 114 may be primarily assigned to handle inbound and outbound delivery processing for a respective set of n truck doors/transport bays 102 that are located proximate to the I/O conveyor module 114 so as to minimize the distance required for forklifts to load and unload storage items between the trucks and the module 114. Preferably, for some configurations of I/O conveyor modules 114, each I/O conveyor module 114 is assigned to handle deliveries from a set of five truck doors/transport bays 102. Other assignments are possible as well, such as providing a different I/O conveyor module 114 for every 2, 3, 4, 6, 7, or 8 truck doors/transport bays 102.

A number of outbound lanes in each I/O conveyor module 114 may be determined, in part, based on the number of truck doors/delivery bays 102 assigned to the module 114. In general, as the number of truck doors/delivery bays 102 assigned to a given module 114 increases, the number of outbound conveyor lanes in the module 114 may also be increased (e.g., direct correlation between the number of assigned truck doors/delivery bays 102 and the number of outbound delivery lanes). In general, a ratio of about 2 outbound delivery lanes for each assigned truck door/delivery bay 102 may yield desirable performance factors. A ratio of 9:4 is shown in FIG. 1.

The lengths of outbound conveyor lanes and inbound conveyor lanes in the I/O conveyor modules 114*a-c* is also a factor that impacts how many storage items may be queued in the docking area 122 while waiting for truck deliveries or drop-offs. In some implementations, the lengths of all the lanes is substantially equal, in that they extend to a particular distance from the back wall of the docking area 122. The lanes should be sufficiently long to allow items to be queued in an efficient manner, but no so long as to unduly restrict the movement of forklifts that load and unload storage items from trucks at the truck doors/bays 102 and the conveyor lanes.

Each I/O receiving module 114*a-c* may be located near one or more passages 120 through which conveyors pass to permit transfer of storage items from the storage area 124 to the docking area 122 of the warehouse 100. Preferably, at least one inbound passage and at least one outbound passage is provided for each I/O receiving module 114*a-c*. By providing separate inbound and outbound passages 120, fewer hang-ups or delays may result while inbound storage items and outbound storage items are transferred between the storage area 124 and docking area 122. In some implementations, as shown in FIG. 1, a single outbound passage 120 with conveyor connected to outbound lanes may serve a particular I/O conveyor module 114, while two inbound passages 120 with conveyors connected to inbound lanes also serve the particular I/O conveyor module 114.

In some implementations, conveyors may link all or some of the passages 120 so that each of the passages 120 can be used as a back-up for all or some of the other passages 120. This linking can add redundancy to the system so that if, at any time, a particular passage 120 becomes unusable (e.g., due to a malfunction, a planned repair, or the throughput for the particular passage 120 becomes too low), then the system may re-direct inbound storage items and/or outbound storage items through another one of the passages 120 with little overall disruption to the flow of storage items in the warehouse. For example, if a first passage that is primarily assigned to allow passage of outbound storage items to a first I/O module 114*a* is closed, the conveyors 106 in the system may automatically re-direct outbound storage items destined for the first I/O module 114*a* through a different, second passage that is primarily assigned to passing outbound storage items to a second I/O module 114*b*. However, using conveyors 106 that link the first passage to the second passage, the system can ensure that outbound storage items still reach the first I/O module 114*a* by passing the storage items from the storage area 124 to the docking area 122 through the second passage that is primarily associated with the second I/O module 114*b*, rather than passing the items through the first passage.

The set of conveyors 106 may further include a routing conveyor module 116. The routing conveyor module 116 is configured to direct inbound and outbound storage items between I/O conveyor modules 114*a-c* and the lift 108 (or other component of an automatic shuttling subsystem). The routing conveyor module 116 may include conveyors 130 located in the docking area 122 and/or conveyors 132 located in the storage area 124. The routing conveyor module 116 may be configured to efficiently transport storage items carried on its conveyors from an I/O storage module 114 to a lift 108.

In some implementations, the routing conveyor module 116 connects each I/O storage module 114*a-c* to each lift 108/automated shuttling subsystem in the storage area 124. The routing conveyor module 116 and its docking area conveyors 130 and/or its storage area conveyors 132 can also include redundant conveyor lanes such that, if one or more primary conveyor lanes becomes unusable (e.g., due to maintenance, repair, or processing delays and congestion), the redundant lanes may be used instead to maintain throughput at each of the I/O conveyor modules 114*a-c*.

Figure 2:
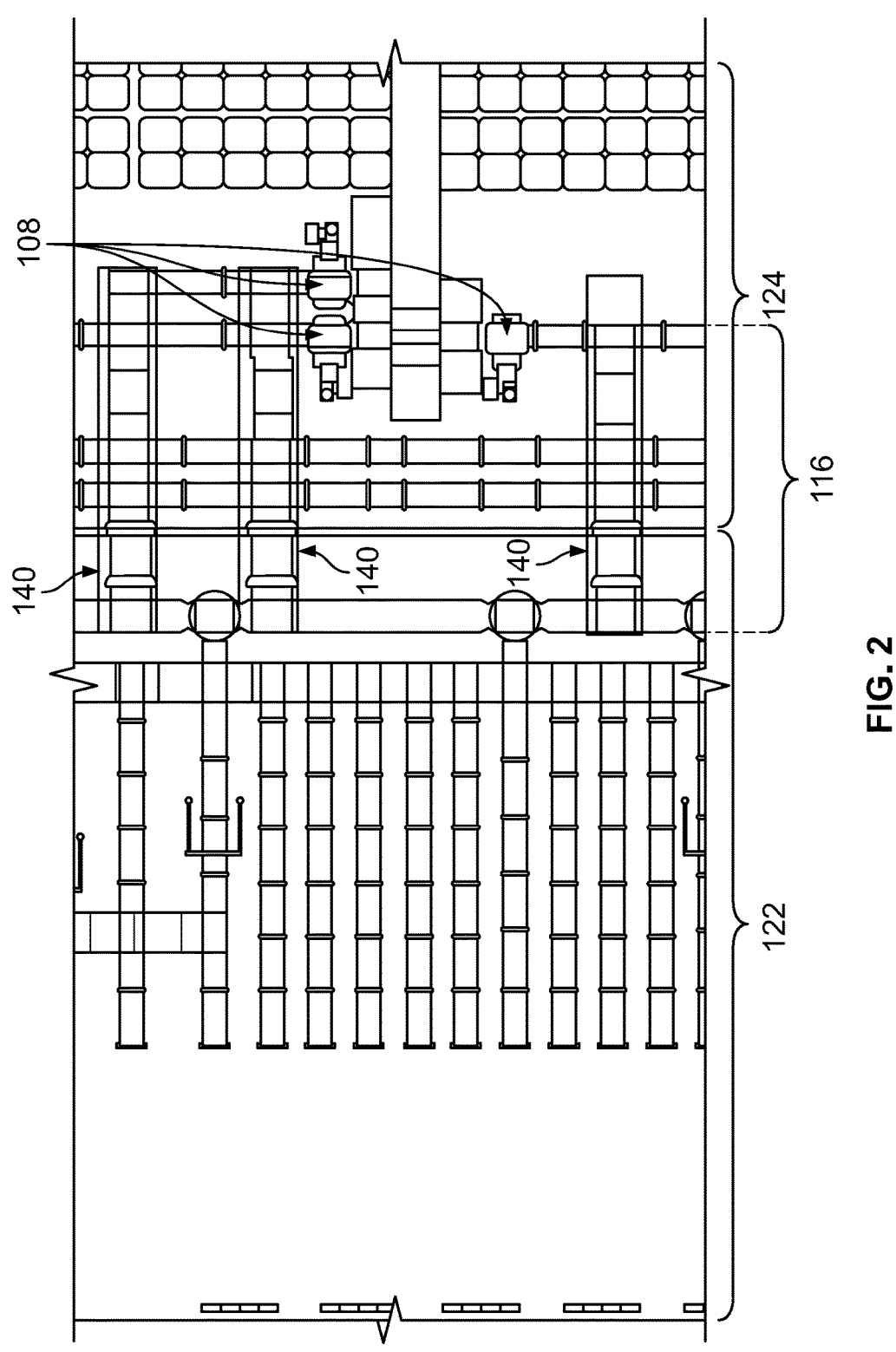
FIG. 2 is a conceptual diagram of a portion of an automated warehouse.

FIG. 2 is a conceptual diagram of a portion of an automated warehouse 100. In this example, the warehouse 100 includes a set of direct-transport conveyors 140. Each direct-transport conveyor 140 is configured to run either (i) directly from a conveyor in the docking area 122 to a lift 108 in the storage area 124, or (ii) directly from a conveyor in the docking area 122 to an end portion of the routing conveyor module 116 nearest a lift 108 where pallets are queued immediately before being loaded on the lift 108 or immediately after removal from the lift 108. For instance, as shown in the figure, three direct-transport conveyors 140 run straight from the backside of the docking area 122 to an end portion of routing conveyor module 116 at adjacent positions near the lifts 108 in storage area 124. The direct-transport conveyors 140 provide an option for highly efficient routing of pallets between the docking area 122 and storage area 124 by bypassing intermediate portions of the routing conveyor module 116 (e.g., redundant lanes).

Simulations have shown that pallet throughput and warehouse operating efficiency are improved by the addition of direct-transport conveyors 140. For example, situations may arise during the normal operation of a warehouse 100 where pallets need to be moved directly from the racks 112 to a truck or vice versa. The direct-transport conveyors 140 can facilitate the direct movement from the lifts 108 to the docking area 122, or from the docking area 122 to the lifts 108.

In some implementations, the direct-transport conveyors 140 are optimized to meet the demands and configuration of the particular warehouse 100 in which they are installed. For example, if the warehouse 100 includes crossing lanes that would interfere with direct-transport conveyors 140 (e.g., redundant conveyor lanes), then the direct-transport conveyors 140 may vary in height to ride above or below the other conveyors without interference. In other implementations, the direct-transport conveyors 140 may intersect all or some crossing lanes in its path. At each intersection, pallets may be re-directed off the direct-transport conveyor 140 to the crossing lane, or onto the direct-transport conveyor 140 from the crossing lane. In this way, pallets may be advanced from a waiting position in the queue on an intermediate portion of the routing conveyor module 140 to the lift 108 in a maneuver that may not otherwise be available without the direct-transport conveyor 140.

Each direct-transport conveyor 140 passes through the dividing wall between the docking area 122 and the storage area 124. The direct-transport conveyors 140 may share the same passages as 120 as other conveyors in module 116, or may be provided with separate passages dedicated to direct transport. The number of direct-transport conveyors 140 may vary in different designs. In some implementations, each I/O conveyor module 114 in the docking area 122 includes its own direct-transport conveyor 140. In some implementations, each lift 108 in the storage area 124 includes its own direct-transport conveyor 140. In some implementations, the warehouse 100 may include fewer direct-transport conveyors 140 than I/O conveyor modules 114 or lifts 108

Figure 3:
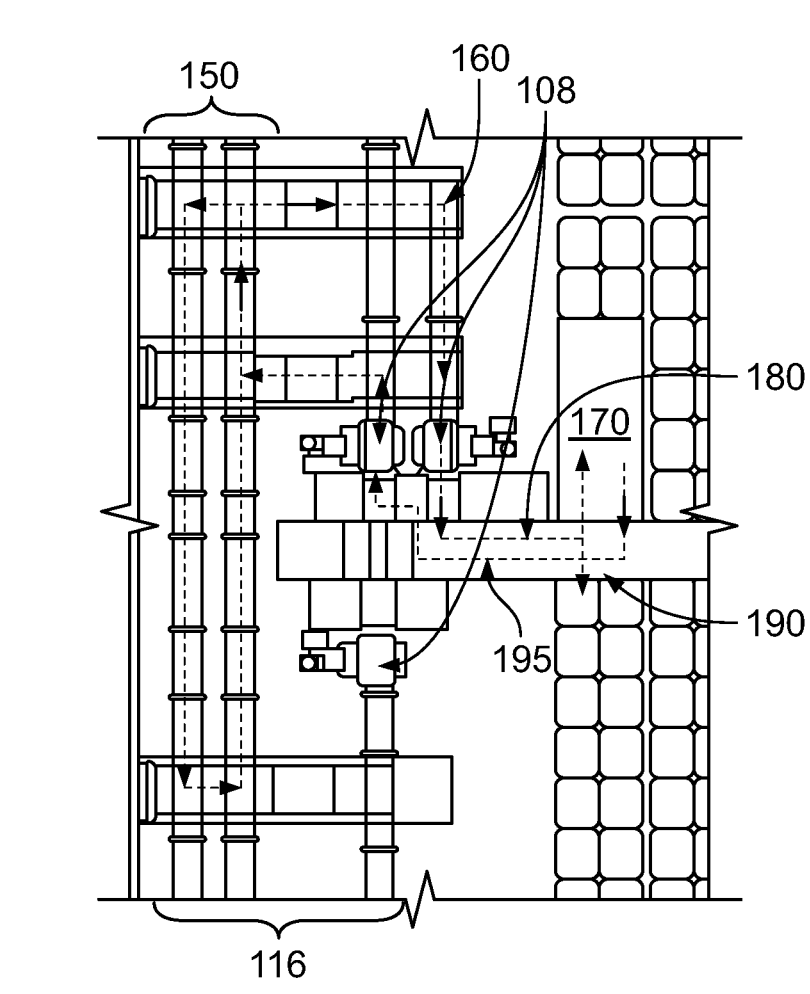
FIG. 3 is a conceptual diagram of a portion of an automated warehouse having a temporary storage location.

FIG. 3 is a conceptual diagram of a portion of the automated warehouse 100 having a temporary storage location 170 (e.g., reserved storage location). The storage location 170 can be designated to receive any items, regardless of their contents, characteristics, and/or SKUs/information. As described herein, the storage location 170 can be part of a storage area in the warehouse 100 (e.g., storage area 124 in FIG. 1). In other words, the temporary storage location 170 can be racks or some other storage area that would typically receive one or more items for storage. Therefore, an area in the storage area can be designated as the temporary storage location 170 based on determining that the area does not have any items already stored there. Moreover, the temporary storage location 170 can change based on one or more conditions in the warehouse 100. For example, one day the temporary storage location 170 can be designated next to a first lift mechanism and a second day the temporary storage location 170 can be designated next to a second lift mechanism. On the second day, the area next to the first lift mechanism may be needed for storing one or more items that are coming into the warehouse 100 while the area next to the second lift mechanism may not be needed for storing items that come into the warehouse 100 that day.

Each storage area can, for example, have one or more designated temporary storage locations 170. For example, a storage location can be designated next to each lift mechanism in the storage area. The storage location 170 can be located on a first level of storage levels. Designating the storage location 170 on the first level nearest lift mechanisms 108 (e.g., elevators, cranes, mechanical-moving device) is advantageous because one or more items can be more quickly moved into the storage location 170 from the first level of the warehouse 100 without using the respective lift mechanism 108 or without requiring a significant amount of time from the respective lift mechanism 108 (e.g., the item simply needs to pass through the lift to storage locations on the other side of the lift, and not be lifted to higher levels). As a result, the lift mechanisms 108 can move other items to their designated storage locations without spending time moving up and down to different levels to put items in temporary storage locations.

In other implementations, it can be advantageous to have temporary storage locations on levels other than or in addition to the first level of storage. In examples in which lift mechanism 108 is able to move multiple items at a time, the lift mechanism 108 can move multiple items at a time to a level above the first level. All the multiple items can have destination storage locations on the same level. An item of the multiple items may require stowage immediately but may be in a position in the lift mechanism 108 that does not allow the item to be removed first from the lift 108. Therefore, the other items on the lift 108 can be automatically moved into a temporary storage location on that level in the storage area. The item can be moved to its destination storage location and then the other items that were moved into the temporary storage location can be routed to their destination storage locations on that level. This can be a more efficient process than filling the lift 108 with one item at a time. After all, the lift 108 would not have to take multiple trips up and down to move multiple items going to the same level in the storage area.

By way of example, FIG. 3 depicts the storage location 170 next to the lift mechanisms 108 on the first level of the warehouse 100. Routing conveyor module 116 (e.g., mechanical conveying system) can include conveyor belts, conveyor rollers, and/or a trolley system. The routing conveyor module 116 can automatically move items from a docking area of the warehouse 100 to destination storage locations of the warehouse without human intervention (e.g., refer to FIGS. 1-2), such that items may be moved by the system automatically after being placed onto the mechanical conveying system with a forklift, without user input that assigns and/or changes a destination storage location for items. The one or more lift mechanisms 108 can be located along a route to destination storage locations (e.g., refer to FIGS. 1-2).

Items can be automatically moved into a loop 150 on a conveying lane of the routing conveyor module 116. The items can remain in the loop 150 until they are routed to the lift mechanism(s) 108 for storage in the storage area of the warehouse 100. When items are routed to the lift mechanism 108, they can be automatically moved into a queue 160. One or more items can be designated for specific lift mechanisms 108. For example, items that are to be stored in cold storage areas can be designated and moved to one lift while items that are not temperature-dependent can be designated and moved to another lift.

Items can continuously be added to the queue 160 in front of the lift 108. Over time, as a result of many items being added to the queue 160, the queue 160 can extend out into the loop 150. When the queue 160 extends out into the loop 150, bottlenecks may result (e.g., increased volume of items coming into the warehouse, increased volume of items in the queue 160, other items cannot be added to the queue 160, other items cannot continue moving through the loop 150), which decreases efficiency of the warehouse 100 and an ability of warehouse components to move items to their designated storage locations.

When bottlenecks arise, one or more items that are in the queue 160 can be moved into the temporary storage location 170 along a temporary storage route 180. The item or items closest to the lift 108 can be moved into the temporary storage location 170. In other words, such item(s) can be moved out of the queue 160 (e.g., out of the way) such that other items in the queue 160 can be moved along to resolve the bottleneck. The other items in the queue 160 can be moved to their destination storage locations and/or additional items can be added to an end/back of the queue 160 while the one or more items are in the storage location 170.

The one or more items designated for temporary storage can be routed through the lift 108 and into the storage location 170. In some examples, the one or more items can be routed around the lift 108 and into the storage location 170. Once one or more items from the queue 160 are moved into the temporary storage location 170, other items in the queue 160 can continue being moved to their destination storage locations along a destination storage route 190. As depicted in FIG. 3, the destination storage route 190 can be through the lift 108 and into a destination storage location on the first level of the storage area or any other level in the storage area.

After one or more items in the queue 160 are moved to their destination storage locations (e.g., via the destination storage route 190) and/or the bottlenecks are resolved (e.g., the queue 160 has no items on it), the items moved into the temporary storage location 170 can be re-routed. For example, the items in the storage location 170 can be re-routed back to their positions in the queue 160 before they were initially routed to the storage location 170. The items can be automatically moved from the storage location 170 along a return route 195. The return route 195 can bring the items back to the lift 108. The return route 195 can also bring the items back through the same lift 108 or through a different lift 108. In other implementations, the return route 195 can bring the items back by passing the items around the lift 108. The return route 195 can return the items back to their original positions in the queue 160, as previously mentioned. The return route 195 can also move the items back into the loop 150, regardless of the items previous position(s) before being routed to the temporary storage location 170. Additional items may have been added to the loop 150 while the re-routed items were in the temporary storage location 170. Therefore, when the re-routed items return to the loop 150, they can be placed before, behind, and/or in between any of the additional items that were added to the loop 150. As yet another example, the return route 195 can bring the items farther back along an aisle in the storage area on the same level.

As another example, the items in the storage location 170 can be re-routed directly to their destination storage locations in the storage area (e.g., via the destination storage route 190). The items can be automatically moved from the storage location 170 to designated storage locations on the same level. The items can also be automatically moved to the lift 108 then moved to designated storage areas on other levels in the storage area.

Figure 4A:
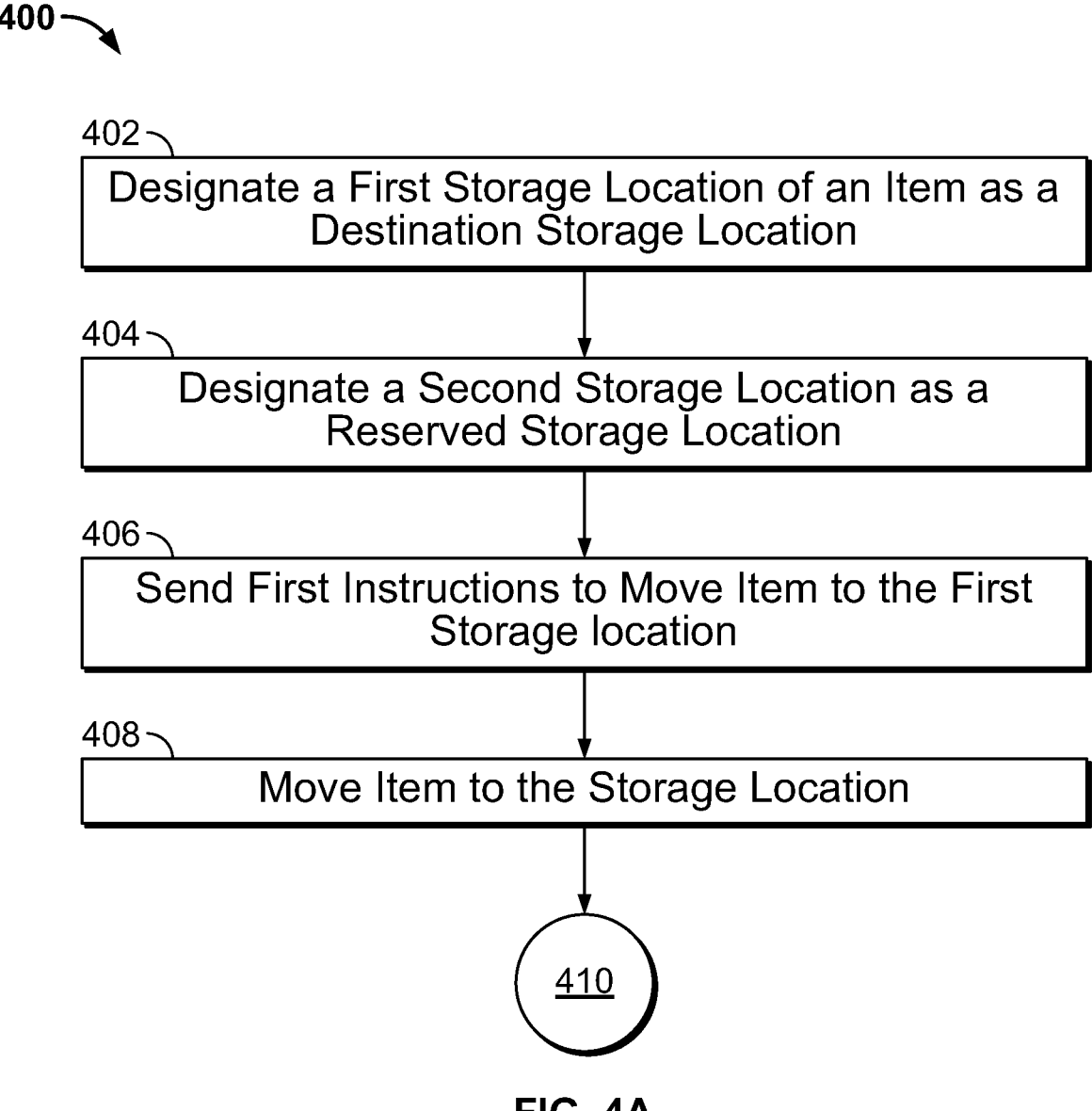
Figure 4B:
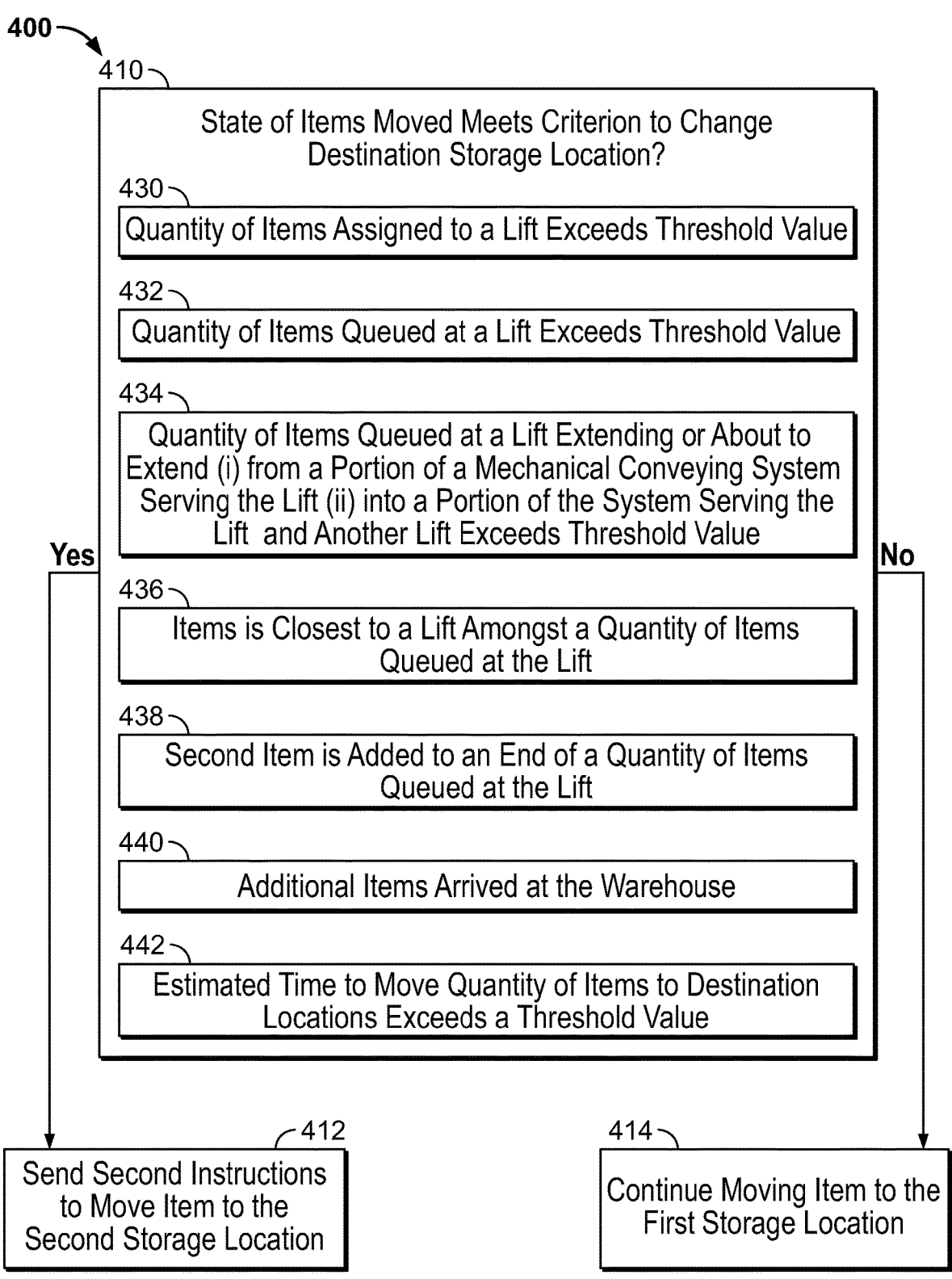

FIGS. 4A-C depict a flowchart of a process 400 for re-routing items in the warehouse environment. The process 400 can be performed by a computing system as described herein. Referring to both FIGS. 4A-C, a first storage location of an item can be designated as a destination storage location (402). The item can be a pallet with boxes thereon. The first storage location of the item can be a location in the warehouse where the item will be stored for some amount of time, for example, until the item is scheduled for delivery to a customer (e.g., racks 112 in storage area 124 in FIG. 1). The first storage location can be determined by a warehouse management system once the item comes into the warehouse. In some implementations, the first storage location can be determined based on characteristics of the item, such as how long the item will be stored in the warehouse, a temperature to maintain that item, and/or contents of the item. Moreover, since the warehouse can store items on multiple levels, the first storage location can be located above a first level of the multiple levels.

A second storage location can be designated as a reserved storage location in 404. The reserved storage location (e.g., temporary storage location) can be on the first level of the multiple levels of the warehouse (e.g., storage location 170 in FIG. 3). In some implementations, the reserved storage location can be on a different level of the multiple levels of the warehouse. The second storage location can be reserved for items that are to be re-routed during movement of items in the warehouse by a mechanical conveying system (e.g., refer to FIG. 3).

In some implementations, more than one storage location can be reserved on the first level of the multiple levels of the warehouse. Additionally and/or alternatively, more than one storage location can be reserved on different levels of the multiple levels of the warehouse. Each of these temporary storage locations can be reserved for items that are to be re-routed during movement of the items throughout the warehouse. A number of temporary storage locations to reserve can also change based on changing conditions in the warehouse. For example, if the warehouse is receiving more items than usual and multiple bottlenecks are occurring during storage of such items, multiple temporary storage locations can be reserved in different areas of the warehouse. As another example, if the warehouse is functioning as normal but is experiencing one or a few bottlenecks, it can be more advantageous to reserve only one temporary storage location nearest to an area where the bottleneck occurs.

When one of the reserved storage locations fills up with items that are being re-routed, any other items that need to be re-routed can be re-routed to other reserved storage locations. In some examples, items can be re-routed to different reserved storage locations based on one or more characteristics of the re-routed items. For example, re-routed items that need to be stored in cold storage can be re-routed to a cold reserved storage location. Re-routed items that have no temperature requirements can be re-routed to another reserved storage location. In other examples, items, regardless of their characteristics can be re-routed to any of the reserved storage locations. This re-routing can occur randomly, based on a first available storage location, a closest storage location to the items, a closest storage location to the items' final destination storage locations, etc.

Referring back to the process 400, first instructions can be sent to the mechanical conveying system (e.g., routing conveyor module 116 in FIGS. 1-3) to move the item to the first storage location (406). Based on designating the first storage location as the destination storage location for the item, the mechanical conveying system can be instructed to automatically move the item from a first current position of the item in the warehouse to the first storage location using the mechanical conveying system. In some implementations, the first current position can be on a conveying lane in a docking area of the warehouse (e.g., conveying lane 130 in FIG. 1, loop 150 in FIG. 3). In other implementations, the item's first current position can be on a conveying lane leading to one of the lifts in the warehouse (e.g., queue 160 in FIG. 3). The first current position can also be any location in the warehouse that is not the destination storage location of the item.

The item can be moved to the first storage location (408). In other words, the mechanical conveying system can begin to automatically move the item from its first current position to its destination storage location. For example, the item can be moved from a loop on a conveying lane (e.g., look 150 in FIG. 3) to a queue (e.g., queue 160 in FIG. 3) that is designated for a particular lift that will lead to the destination storage location.

While the item is being moved to the first storage location (e.g., while the item is on the mechanical conveying system but before it has reached its destination storage location, regardless of whether the item is actually being moved or is still at the moment), the computing system can determine whether a state of items being moved meets a criterion to change the destination storage location of the item (410). The criterion can be a quantity of items (e.g., a queue of items) exceeding a threshold value (430). The quantity of items can be assigned to a lift and the item can be one of the items assigned to that lift. Therefore, if too many items, including the item, are assigned to the lift at a given time (e.g., the number of items assigned exceeds a predetermined number of items that can be assigned to the lift), then the criterion is met and the destination storage location of the item can be changed. The number of items assigned to a lift can include all items being routed to a lift by the mechanical conveying system (or maybe even items currently being delivered to the warehouse), even if those items are not currently in the queue 160 of FIG. 3. The threshold value can be different for each lift in the warehouse. The threshold value can be determined by the computing system, a warehouse management system, and/or a warehouse worker. The threshold value can also be determined based on one or more conditions of the warehouse (e.g., increased volume of items entering the warehouse).

As another example, the quantity of items assigned to the lift can be a quantity of items queued at the lift (432). The criterion to change the destination location for the item can then include the quantity of items queued at the life exceeding a threshold value. Where the item is part of a queue in front of the lift and that queue becomes too long (e.g., a number of items in the queue exceeds a predetermined number of items that can be in that queue at any given time), then the criterion is met and the destination storage location of the item can be changed.

Moreover, the criterion to change the destination location for the item can include the quantity of items queued at the lift extending or about to extend (i) from a portion of the mechanical conveying system that serves the lift and not a second lift (ii) into a portion of the mechanical conveying system that serves the lift and the second lift (434). For example, the queue or line of items in front of the first lift can extend out into the loop of conveying lane(s) (e.g., the loop 150 in FIG. 3). Such a long queue can obstruct other items from moving in the loop, getting added to the queue for the first lift, or getting added to a queue for a second lift or any other lift. This can cause one or more bottlenecks. It can be advantageous, therefore, to change the destination storage location of the item in the queue of items to the temporary storage location. Moving the item to the temporary storage location can result in all the items in the queue moving up, thereby removing the one or more bottlenecks in the loop and/or at the end of the queue.

The criterion to change the destination storage location for the item can also include the item being closest to the lift among the quantity of items queued at the lift (436). For example, where the item is located at a front of the queue, the item is easiest to re-route into a temporary storage location versus an item in a middle or an end of the queue. As a result, the item at the front of the queue can be chosen for re-routing to the temporary storage location. In some examples, one or more additional items behind the item at the front of the queue can also be chosen for re-routing to the temporary storage location. Such a determination can be made based at least in part on an urgency of (1) storing one or more items farther down the queue or (2) one or more bottlenecks.

Additionally, determining whether to change the destination storage location for the item can be based on identifying that a second item has been added to an end of the quantity of items queued at the lift (438). For example, as soon as another item is added to the end of the queue of items, the item's destination storage location can be changed to the temporary storage location to prevent any potential bottleneck or slowdown from occurring. This is especially beneficial where the second item added at the end of the queue has a greater urgency for immediate storage in comparison to the item.

As another example, determining whether to change the destination storage location for the item can be based on identifying that additional items have arrived at the warehouse (440). The additional items can require immediate storage and/or have other conditions that make these items higher priority than one or more items already in the warehouse, such as the item.

In yet other implementations, the criterion can be a projected (e.g., estimated) time to move the quantity of items to their destination storage locations exceeding a threshold value (442). For example, if the computing system determines that moving all the items in the queue will take longer than a predetermined amount of time that the process should take, the destination storage location of the item can be changed to the temporary storage location.

If the criterion is met to change the destination storage location of the item (410), then second instructions can be sent to the mechanical conveying system to move the item to the second storage location (412). As described herein, the second storage location can be one of the reserved temporary storage locations that were designated in 404.

If the criterion is not met, then the mechanical conveying system can continue to move the item to the first storage location (414). Thus, the item can be moved to its destination storage location in the storage area of the warehouse without being re-routed.

After sending the second instructions to the mechanical conveying system to move the item to the second storage location (412), the item can be moved to the second storage location in 416. The item can be placed in the temporary storage location (e.g., second storage location) and kept there until a bottleneck is resolved or other conditions are met.

The second instructions can designate a second current position of the item from which the mechanical conveying system can move the item. As described throughout this disclosure, the current position of the item can be at a front of the queue of items at the lift. The item can then be automatically moved from its second current position to the temporary storage location (e.g., second storage location).

Once the item is in the temporary storage location, the computing system can repeatedly determine whether a state of items being moved meets a second criterion to change the storage location of the item (418). For example, the computing system can determine whether a bottleneck has been resolved such that the item can be removed from the temporary storage location and routed to a different storage location (444).

The second criterion can include the quantity of items assigned to the lift being below a second threshold value (446). The second threshold value can be less than the threshold value in 410. In other words, if the number of items assigned to a particular lift has been reduced (e.g., assigned items have been moved to their destination storage locations) below a maximum number of items that can be assigned at a given time to the particular lift, then the criterion is met and it can be determined that the item in the temporary storage location can be moved.

As another example the second criterion can be that no items are assigned to the lift (448). Items assigned to the particular lift may already have been moved to their destination storage locations while the item was in the temporary storage location. Therefore, no items are assigned to the particular lift and the item in the temporary storage location can be moved out of temporary storage.

If the criterion to change the storage location of the item is met (418), then third instructions can be sent to the mechanical conveying system to move the item to a different storage location (420). The item can be automatically moved, by the mechanical conveying system, out of the temporary storage location to the different storage location.

As described throughout, the different storage location can be the first storage location (e.g., the original destination storage location of the item as designated in 402). Therefore, the item can be automatically routed from the temporary storage location to its destination storage location.

In other implementations, the different storage location can be the first current position of the item (e.g., refer to FIG. 3). Therefore, the item can be automatically routed from the temporary storage location back into its original position in the queue and/or loop (e.g., the position the item was in before it was routed to the temporary storage location). In yet other implementations, the item can be automatically routed from the temporary storage location into a random position in the loop or queue. For example, additional items may have been placed in the loop or queue while the item was in the temporary storage location. Rather than disrupting movement of the additional items in the loop and/or queue, the item can be routed from the storage location into any open position in the loop and/or queue.

If the criterion to change the storage location of the item is not met (418), then the item can remain in the second storage location (422). In other words, the computing system can determine that one or more bottlenecks have not been resolved. The item can remain in the temporary storage location until the computing system determines that the one or more bottlenecks are resolved.

In some implementations, the item can remain in the temporary storage location until it is designated to leave the warehouse. For example, the item may be designated for storage in the warehouse for a short period of time. The short period of time may not make it efficient for the computing system to instruct the mechanical conveying system to route the item to a storage location in the warehouse. Instead, the item can be routed to the temporary storage location and kept there for the short period of time that the item needs to be stored in the warehouse. Once the period of time is over, the item can be routed from the temporary storage location to the docking area of the warehouse. From there, the item can be loaded onto a truck and removed from the warehouse.

The process of storing the item in the temporary storage location for the short period of time can be more efficient than storing the item in its designated storage location. This is possible since the temporary storage location can be closer to the docking area than other locations in the storage area. Therefore, when the item needs to be moved to the docking area, it can take less time to access the item then move it from the temporary storage location to the docking area. In comparison, had the item been stored in its original destination storage location, it can take more time to move the item from that location to the docking area (e.g., the destination storage location can be at an end of the storage area that is farthest away from the docking area, the destination storage location can be behind or blocked by other storage locations and items therein, the destination storage location can be on a different level above the first level where the docking area is located, etc.). Therefore, it can be advantageous to store the item for the short period of time in the temporary storage location.

Figure 5:
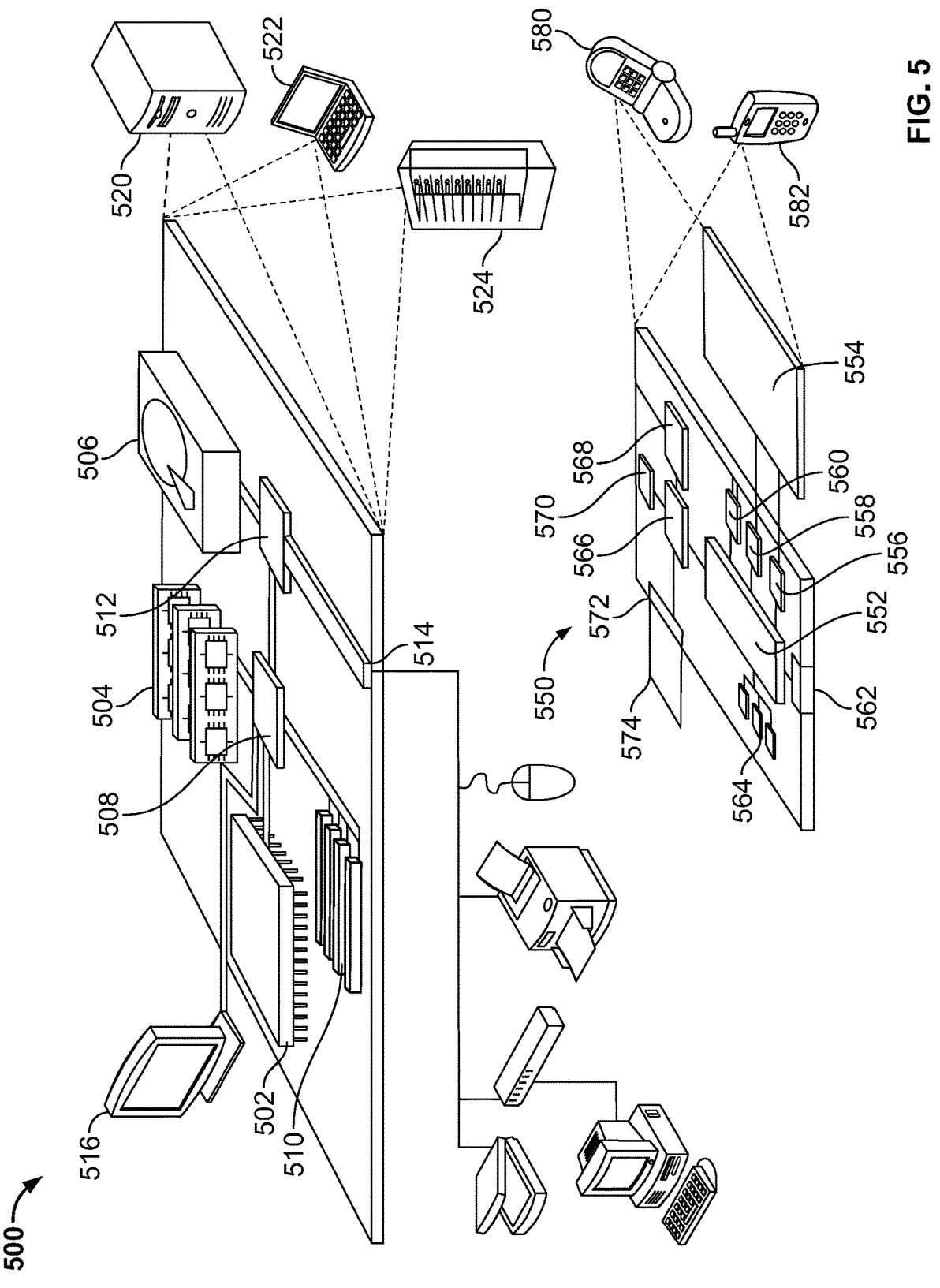
FIG. 5 is a block diagram of computing devices that may be used to implement the systems and methods described herein.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method for re-routing items in a warehouse, comprising:
designating, by a computing system, a first storage location in the warehouse as a destination storage location for an item;
sending, by the computing system as a result of the first storage location being designated as the destination storage location for the item, first instructions to a mechanical conveying system to automatically move the item from a first current position of the item in the warehouse to the first storage location using the mechanical conveying system;
determining, by the computing system while the item is being moved to the first storage location by the mechanical conveying system, that a state of items being moved by the mechanical conveying system satisfies a criterion to change the destination storage location for the item from the first storage location to a second storage location; and
sending, by the computing system, second instructions to the mechanical conveying system to automatically move the item from a second current position of the item in the warehouse to the second storage location using the mechanical conveying system.

2. The method of claim 1, wherein the mechanical conveying system includes conveyor belts, conveyor rollers, or a trolley system that move items from a docking area of the warehouse to destination storage locations of the warehouse without user intervention.

3. The method of claim 1, wherein:
the warehouse stores items on multiple levels;

the first storage location is located above a first level of the multiple levels; and
the second storage location is a reserved storage location that is on the first level of the multiple levels, wherein the second storage location is reserved for items that are re-routed during movement by the mechanical conveying system.

4. The method of claim 1, wherein the criterion to change the destination location for the item includes a quantity of items exceeding a threshold value, wherein the quantity of items are assigned to a mechanical-moving device that is part of the mechanical conveying system and the item is one of the items assigned to the mechanical-moving device.

5. The method of claim 4, wherein the warehouse stores items on multiple levels, and the mechanical-moving device is a lift adapted to move items from a first level of the multiple levels to levels above the first level of the multiple levels.

6. The method of claim 5, wherein:
the quantity of items assigned to the mechanical-moving device comprises a quantity of items queued at the lift; and
the criterion to change the destination location for the item includes the quantity of items queued at the lift exceeding a threshold value.

7. The method of claim 6, wherein the criterion to change the destination storage location for the item includes the item being closest to the lift among the quantity of items queued at the lift.

8. The method of claim 6, wherein the criterion to change the destination location for the item includes the quantity of items queued at the lift extending or about to extend (i) from a portion of the mechanical conveying system that serves the lift and not a second lift (ii) into a portion of the mechanical conveying system that serves the lift and the second lift.

9. The method of claim 6, further comprising:
identifying that a second item has been added to an end of the quantity of items queued at the lift; and
wherein determining, by the computing system while the item is being moved to the first storage location by the mechanical conveying system, that a state of items being moved by the mechanical conveying system satisfies the criterion to change the destination storage location for the item from the first storage location to a second storage location is performed in response to identifying that the second item has been added to the end of the quantity of items queued at the lift.

10. The method of claim 4, further comprising:
determining, by the computing system while the item is stored at the second storage location, that a state of items being moved by the mechanical conveying systems satisfies a second criterion to change the destination storage location for the item from the second storage location to a different storage location; and
sending, by the computing system, third instructions to the mechanical conveying system to automatically move the item from the second storage location to the different storage location.

11. The method of claim 10, wherein the different storage location is the first storage location.

12. The method of claim 10, wherein the second criterion comprises the quantity of items assigned to the mechanical-moving device being below a second threshold value, the second threshold value being less than the threshold value.

13. The method of claim 10, wherein the second criterion comprises no items being assigned to the mechanical-moving device.

14. The method of claim 1, wherein the item is a pallet with boxes thereon.

15. The method of claim 1, further comprising reserving a plurality of storage locations that are on the first level of the multiple levels, wherein the plurality of storage locations are reserved for items that are re-routed during movement by the mechanical conveying system.

16. A system for re-routing items in a storage facility, the system comprising:

a warehouse having multiple levels to store items;

a mechanical conveying system configured to automatically move an item at a first current position in the warehouse from the first current position in the warehouse to a first storage location, the mechanical conveying system including a mechanical-moving device that is part of the mechanical conveying system and is adapted to move items from a first level of the multiple levels to levels above the first level of the multiple levels;

a second storage location that is a reserved storage location on the first level of the multiple levels of the warehouse; and a computing system configured to:

designate the first storage location in the warehouse as a destination storage location for the item;

send, as a result of the first storage location being designated as the destination storage location for the item, first instructions to the mechanical conveying system to automatically move the item from the first current position of the item to the first storage location;

determine, while the item is being moved to the first storage location by the mechanical conveying system, that a state of items being moved by the mechanical conveying system satisfies a criterion to change the destination storage location for the item from the first storage location to the second storage location; and sending, by the computing system, second instructions to the mechanical conveying system to automatically move the item from a second current position of the item in the warehouse to the second storage location.

17. The system of claim 16, wherein the mechanical conveying system includes conveyor belts, conveyor rollers, or a trolley system that move items from a docking area of the warehouse to destination storage locations of the warehouse without user intervention.

18. The system of claim 16, wherein:

the first storage location is located above the first level of the multiple levels and the second storage location is reserved for items that are re-routed during movement by the mechanical conveying system; and;

the mechanical-moving device is a lift.

19. The system of claim 18, wherein the criterion to change the destination location for the item includes a quantity of items exceeding a threshold value, wherein the quantity of items are assigned to the mechanical-moving device and the item is one of the items assigned to the mechanical-moving device.

20. The system of claim 19, wherein:

the quantity of items assigned to the mechanical-moving device comprises a quantity of items queued at the lift; and the criterion to change the destination location for the item includes the quantity of items queued at the lift exceeding a threshold value.

* * * * *